June 27, 1933.   R. J. WIGHTMAN ET AL   1,915,810
PASTEURIZER
Filed March 3, 1932   2 Sheets-Sheet 2
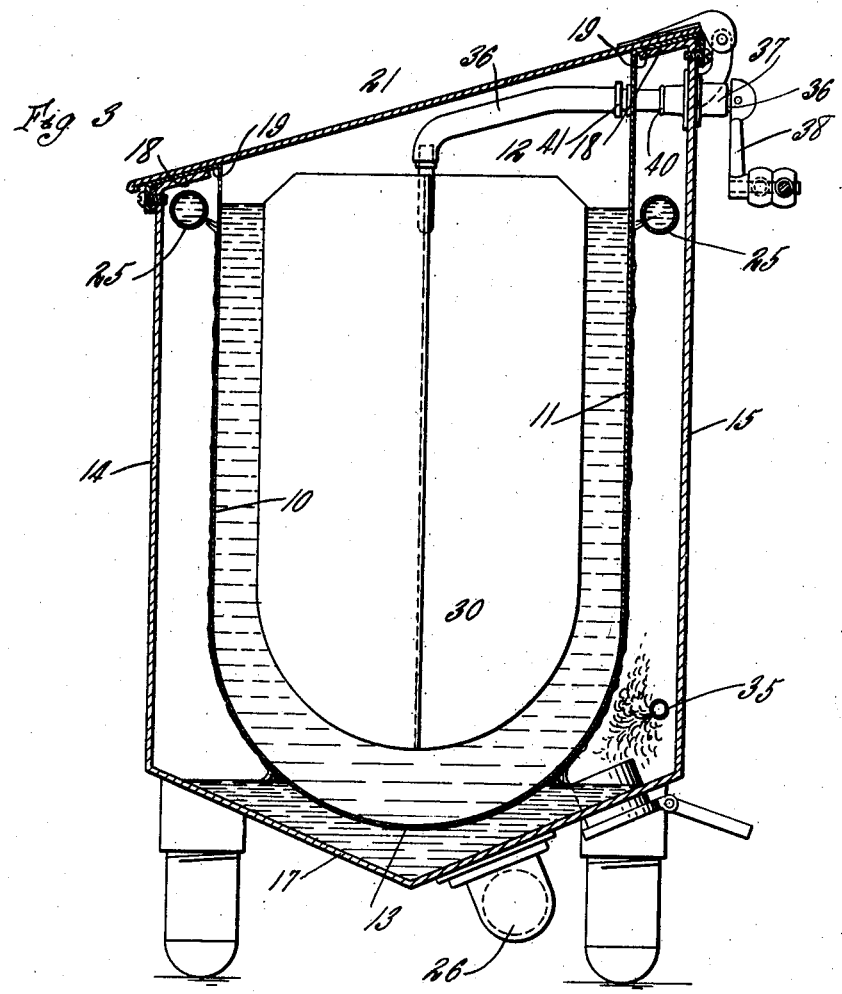
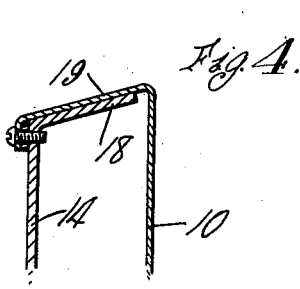
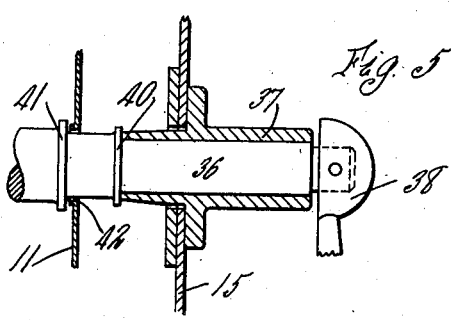
INVENTORS
Roland Jay Wightman
Harvey Feldmeir
by Parker, Grochnow & Harmer
ATTORNEYS Patented June 27, 1933

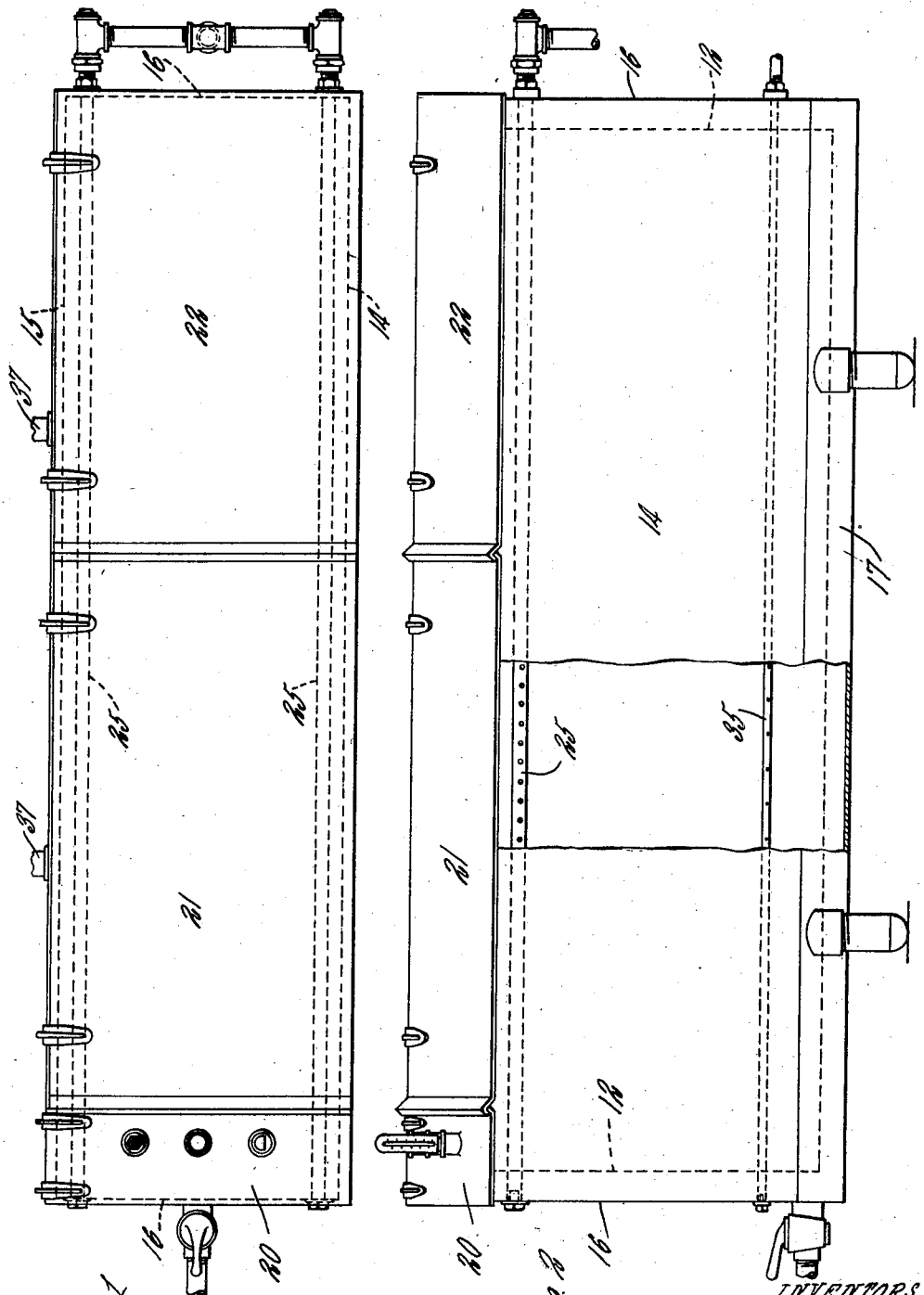

1,915,810

UNITED STATES PATENT OFFICE

ROLAN JAY WIGHTMAN AND HARVEY FELDMEIER, OF LITTLE FALLS, NEW YORK, ASSIGNORS TO CHERRY-BURRELL CORPORATION, OF WILMINGTON, DELAWARE, A CORPORATION OF DELAWARE

PASTEURIZER

Application filed March 3, 1932. Serial No. 596,533.

This invention relates to pasteurizers and more particularly to improvements in milk pasteurizers of the vat type in which a body of milk in the vat is adapted to be heated by a liquid contacting externally with the metal or heat conducting walls of the vat. In a well known pasteurizer of this type, as heretofore constructed, the vat is made with a metal lining which forms the receptacle for the milk and is surrounded by a jacket, spaced from the lining, and the liquid for heating or cooling the milk is discharged against the outer surfaces of the lining from one or more pipes arranged in the upper portion of the space between the lining and the jacket. The heated liquid discharged from the pipes flows downwardly over the outer surfaces of the lining and into the lower portion of the jacket from which the liquid escapes or is withdrawn by circulating means which return the liquid, after it has been reheated to the proper temperature, to the spray pipes.

It has been found desirable in the use of pasteurizers of this type to extend the rear wall of the vat upwardly above the level of the top of the front wall and close the vat by a cover, which slopes downwardly and forwardly from the upper edge of the rear wall to the upper edge of the front wall of the vat, and to agitate the milk in the vat for causing proper contact of the milk with the heated walls of the vat, by paddles depending into the milk from shafts or members which extend out through holes in the upper portion of the rear wall of the vat for connection with the paddle actuating mechanism. This arrangement has recognized advantages. It affords ready and convenient access to the vat for cleaning and inspection by opening the cover, which is preferably hinged to the rear wall. The low unobstructed front of the vat facilitates the thorough cleaning of the interior portions of the apparatus as by means of fluid discharged from a hose, and the high back and cover form a hood or guard which prevents the cleaning fluid from splashing out of the vat over the floor or adjacent apparatus. Inasmuch, however, as a relatively deep air space is left in a hooded or covered vat of such form above the surface of the milk and since in these vats, as heretofore constructed, the heating chamber or space between the vat lining and jacket at the rear of the vat does not extend substantially above the milk level, it follows that the temperature in the air space above the surface of the milk will not be maintained at the required degree during the holding period of pasteurization and the surface of the milk and foam thereon may not be kept at the prescribed pasteurizing temperature unless the vat is very thoroughly insulated, which means an expensive construction. In order to ensure perfect pasteurization it is important to hold the surface of the milk and any foam thereon, as well as the body of milk, at the prescribed pasteurizing temperature for a definite period of time.

One object of this invention is to provide a vat pasteurizer of the character mentioned of a practical and desirable construction which will insure that the surface of the milk in the vat and any foam on the milk will be efficiently heated to and maintained at the required pasteurizing temperature.

In the use of these spray vat pasteurizers, it is the usual practice to heat the milk by means of water heated to a temperature several degrees higher than the pasteurizing temperature for the milk in order to bring the milk to the required temperature in a reasonably short time. After the milk has been raised to the pasteurizing temperature of, for example, 143° F. or 145° F., it is ncessary to hold it at this pasteurizing temperature for a specified period of time, usually about thirty minutes, to effect proper pasteurization of the milk. Inasmuch, however, as the temperature of the water used for heating the milk, as explained, is of higher temperature than the pasteurizing temperature, it is not desirable to continue the use of this hot water for maintaining the milk temperature during the holding period, as that would increase the temperature of the milk and impair its cream line. It is also impractical to reduce the volume or temperature of the water for holding the milk temperature, but provision should be made to preserve the prescribed temperature of the milk throughout the holding period.

Another object of this invention is to provide simple and economical means for accomplishing this result without continuing the application of the heating water to the vat.

Further objects of the invention are to provide simple and efficient means for preventing oil or water from working along the agitator shafts into the milk space, or milk working into the water space; and to improve vat pasteurizers in the other respects hereinafter described and set forth in the claims.

The accompanying drawings illustrate a vat pasteurizer of a practical construction embodying our invention. In said drawings:

Fig. 1 is a plan view of the pasteurizer.

Fig. 2 is a front elevation thereof, partly broken away to show the water and steam pipes at the rear of the vat.

Fig. 3 is a transverse, sectional elevation thereof on an enlarged scale.

Fig. 4 is a detail section showing the manner of joining the lining and jacket walls at the upper edge of the vat.

Fig. 5 is a sectional elevation showing one of the agitator shafts, its bearings and drip rings.

The vat comprises a metal lining which holds the milk and a jacket or outer casing which surrounds the lining with its side and bottom walls, and preferably its end walls also, spaced from the corresponding walls of the lining. The lining is preferably of trough shape or elongated, rectangular form in plan, having upright front and rear walls 10 and 11, end walls 12 and a bottom 13, which is preferably rounded or of semi-cylindrical cross-sectional shape. The jacket is of generally similar shape having front, rear and end walls 14, 15 and 16 respectively, all of which, preferably, are parallel with and spaced from the corresponding walls of the lining, and a connecting bottom 17, which may be, as shown, V-shape in cross section and spaced from the bottom of the lining.

Preferably, the jacket is provided at the upper ends of its side and end walls with inwardly projecting flanges 18, formed by bending inwardly the upper edges of the plates forming said walls, and the lining is provided with outwardly projecting flanges 19 formed by the outbent upper edges of the side and end plates of the lining, the lining flanges overlying and bearing on the jacket flanges and being suitably secured at their outer downbent edges to the jacket, as by screws or welding. The rear walls 11 and 15 of the lining and jacket are higher than the front walls thereof or extend upwardly beyond the upper edges of the front walls, and the end walls of the vat incline downwardly from the upper edge of the rear wall to the front wall. The flanges 18 and 19 of the front and rear walls of the lining and jacket preferably slope correspondingly with the top edges of the end walls of the vat, thus permitting the vat to be closed at its top by a flat plate cover which slopes downwardly and forwardly. A sectional cover is shown comprising overlapping sections 20, 21 and 22 which are separately hinged at their rear edges to the upper edge of the rear wall of the jacket. The supply pipe for delivering the milk to the vat and the usual temperature indicating and recording instruments may extend into the vat through the cover section 20, at one end of the vat, which may be short lengthwise of the vat. This section, if preferred, could be fixed, and the cover can be made in one piece or sectional, as desired.

25 represents perforated pipes arranged horizontally in the upper portions of the spaces between the front and rear walls of the lining and jacket and adapted to spray or discharge the heating liquid onto the upper portions of the outer surfaces of the front and rear walls of the vat lining. The liquid thus discharged onto the walls of the lining is adapted to flow downwardly over these walls and fall from the bottom of the lining into the bottom of the jacket from which the liquid may be discharged or withdrawn through a suitable outlet pipe or connection 26. Spray pipes may also be provided, if desired, at the ends of the vat for discharging the heating liquid on the end walls of the lining, as shown, for example, in Patent Number 1,199,974 to Harvey Feldmeier, assignor to D. H. Burrell & Co., October 3, 1916, but in this application only the pipes 25 at the front and rear of the vat are shown.

In the operation of the apparatus for pasteurizing milk, the vat is filled with milk, preferably to the level indicated in Fig. 3, i e. to a level approximately at the height of the spray pipes 25, and heated water, supplied by suitable connections to the pipes 25, discharges therefrom and flows down over the walls of the lining and discharges through the bottom outlet 26 of the jacket, the water discharging from the bottom of the jacket, in ordinary practice being reheated and returned to the spray pipes so that the same water can be recirculated and used repeatedly. The water, as explained, raises the milk in the vat to the pasteurizing temperature, the milk being agitated in the vat by suitable moving agitator paddles or devices 30 to cause all portions of the milk to contact with the heated walls of the lining. After the milk reaches the required temperature, it is held in the vat for the period of time, usually about thirty minutes, necessary to pasteurize the milk after which the milk is cooled, which may be done either by discharging a cooling liquid through the spray pipes 25, or the milk can be withdrawn from the vat and cooled by means of a separate cooler.

In the construction described, it will be noted that the rear walls 11 and 15 of the lining and jacket both extend upwardly a substantial height above the front walls, and that the space between these rear walls of the lining and jacket extends the full height of the rear portion of the vat. Similarly, the spaces between the end walls of the lining and casing preferably also extend upwardly to the full height of the jacket so that the air space in the upper portion of the covered vat above the surface of the milk is surrounded by these extended portions of the walls of the lining which radiate the heat imparted thereto by the heating medium in the coextensive heating spaces of the jacketed vat and thus maintain the necessary temperature in the air space above the surface of the milk to insure that the surface of the milk and any milk foam, as well as the body of the milk, will be heated to the required pasteurizing temperature.

After the milk has been thus heated to pasteurizing temperature, the water is preferably shut off and the heat necessary for maintaining the pasteurizing temperature of the milk during the holding period is supplied, preferably by discharging steam into the space between the vat lining and jacket, as by means of a small perforated pipe 35 located in and extending from end to end of the lower portion of the space between the rear wall of the jacket and the lining. The admission of this steam to the jacket is regulated as required to maintain the milk in the vat uniformly at the required pasteurizing temperature throughout the holding period. Since the steam or heat therefrom rises into the upper portion of the heating spaces extending above the level of the milk, the surface of the milk and any foam will also be maintained at the pasteurizing temperature.

By the described construction, when the hinged cover is opened, the low front wall and high rear wall of the vat facilitate the thorough cleaning of the interior of the vat and the agitators or other parts in the vat, the low unobstructed front wall affording much more ready access to the vat and the hood formed by the high rear wall and cover preventing splashing of the cleansing or sterilizing medium out of the vat. In addition to the extended upper portions of the walls of the vat lining being heated and insulated by the upwardly extending portions of the walls of the jacket and thus insuring proper heating of the air space in the covered vat above the surface of the milk, the upper extension of the rear part of the vat permits the shafts or members 36 for the agitating paddles 30 to extend out through said upper extension to the exteriorly located bearings 37 and operating mechanism 38 and the front of the apparatus is thus left unobstructed by such parts.

In order to prevent oil from the shaft bearings or water from working along the agitator shafts into the milk space, and milk from working along the shafts into the water space, the following construction is preferably employed. Each agitator shaft is provided with two circumferential drip flanges or rings 40 and 41 located respectively outside and inside of the lining wall 11 through which the shaft passes, with the outer flange at the inner end of the shaft bearing 37 and the inner flange adjacent the inturned edge of the hole 42 in the lining through which the shaft passes. The flange 40 is small enough to pass through the hole 42, while the other flange is larger than the hole. The first flange prevents oil from the bearing from working along the shaft into the milk space, and the other flange prevents any milk splash from working into the heating space between the lining and jacket.

We claim:

1. A vat pasteurizer or the like comprising a lining adapted to contain a liquid, a jacket having a wall at one side of the vat spaced from the corresponding wall of the lining, said walls of the lining and jacket and the space between them extending upwardly a substantial height above the walls of the lining and jacket at the opposite side of the vat whereby said lining and space at said one side of the vat extend above the maximum level of liquid in the vat, a cover closing the upper end of said vat, and means for supplying a medium into the space for heating the first mentioned wall of the lining whereby said wall of the lining acts to efficiently heat both the liquid in the vat and the covered space in the vat above the surface of the liquid.

2. A vat pasteurizer or the like comprising a lining adapted to contain a liquid, a jacket having front and rear walls spaced from the front and rear walls respectively of the lining, the rear walls of the jacket and lining and the space between them extending upwardly a substantial height above the front walls of the jacket and lining whereby said rear walls and the space therebetween extend above the maximum level of the liquid in the vat, a cover closing the upper end of the vat, and means for supplying a heating medium into the spaces between the front and rear walls of the lining and jacket, the liquid in the vat being heated by the heated front and rear walls of the lining and the covered space within the vat above the surface of the liquid being heated, by the portion of the rear wall of the lining extending above the surface of the liquid.

3. A vat pasteurizer comprising a lining adapted to contain a liquid, a jacket having a rear wall spaced from the rear wall of the lining, a cover closing the upper end of the vat, the rear walls of the jacket and lining and the space between the same extending upwardly a substantial height above the front walls of the jacket and lining whereby said rear walls and the space therebetween extend above the maximum level of the liquid in the vat, means for discharging a heating medium on the wall of the lining within said space, and independent supplemental heating means for maintaining the liquid in the vat at the temperature to which it is raised by said heating medium.

4. A vat pasteurizer comprising a lining adapted to contain a liquid, a jacket having a rear wall spaced from the rear wall of the lining, a cover for the upper end of the vat, the rear walls of the jacket and lining and the space between the same extending upwardly to a greater height than the front walls of the jacket and lining, means for discharging a heating medium on the wall of the lining within said space, and means for delivering steam into the space between the vat jacket and lining for maintaining the liquid in the vat at the temperature to which it is raised by said first mentioned heating medium.

5. A pasteurizer vat comprising a lining and an outer casing, the walls of said lining and casing at one side of the vat defining a heating space which extends upwardly a substantial height above the opposite side of the vat, a cover closing the upper end of the vat whereby said heating space extends above the maximum level of liquid in the vat, and means for supplying a heating medium in said heating space for heating a liquid in the vat and the space in the vat above the liquid.

6. A pasteurizer vat comprising a lining adapted to contain a liquid to be pasteurized, and an outer casing, said casing and lining forming a heating space therebetween, means for circulating a heated liquid externally over said lining within said heating space for heating the contents of the lining, and supplemental means for delivering a heating medium into said heating space for heating the same independently of said liquid.

7. A pasteurizer vat comprising a lining adapted to contain a liquid to be pasteurized, and an outer casing, said casing and lining forming a heating space therebetween, means for causing a heated liquid to flow in a film over the external surface of said lining within said heating space for heating the contents of the lining, and means for delivering steam independently of said liquid into said space for heating the contents of the lining independently of said heating liquid.

8. A vat pasteurizer or the like comprising a lining adapted to contain a liquid, a jacket having a wall spaced from a wall of the lining, an agitator for the liquid having a shaft extending through a hole in said lining wall, and a bearing for said shaft outside of said lining wall, said shaft having circumferential drip flanges thereon at opposite sides of said lining wall with the outer flange between said bearing and the wall for preventing liquid working along said shaft in either direction through the hole in said lining wall.

9. A vat pasteurizer or the like comprising a lining adapted to contain a liquid, a jacket having a wall spaced from a wall of the lining, an agitator for the liquid having a shaft extending through a hole in said lining wall, and a bearing for said shaft outside of said lining wall, said shaft having circumferential drip flanges thereon at opposite sides of said lining wall for preventing liquid working along said shaft in either direction through the hole in said lining wall, one of said flanges being of a size to pass through said hole.

10. A vat pasteurizer comprising a lining adapted to contain a liquid to be pasteurized, and a jacket, the walls of said lining and jacket at one side of the vat forming a space for a heating medium, said walls and space extending upwardly to a greater height than the walls at the opposite side of the vat, and an agitator for said liquid having an actuating shaft passing through said upwardly extended portions of said walls and heating space.

11. A vat pasteurizer or the like comprising a lining adapted to contain a liquid, a jacket having front, rear and end walls spaced from the corresponding walls of the lining, the rear and end walls of the jacket and lining and the spaces therebetween extending upwardly a substantial height above the front walls of the jacket and lining whereby said rear and end walls and the spaces therebetween extend above the maximum level of liquid in the vat, a cover closing the upper end of the vat, and means for supplying a heating medium into said spaces between the jacket and lining for heating a liquid in the vat and also the covered space in the vat above the liquid.

ROLAN JAY WIGHTMAN.
HARVEY FELDMEIER.

CERTIFICATE OF CORRECTION.

Patent No. 1,915,810.                                                                               June 27, 1933.

ROLAN JAY WIGHTMAN, ET AL.

It is hereby certified that error appears in the printed specification of the above numbered patent requiring correction as follows: Page 4, lines 40 and 41, claim 5, strike out the words "whereby said heating space extends above the maximum level of liquid in the vat" and insert the same after "vat" and before the comma in line 39, of said claim; and that the said Letters Patent should be read with this correction therein that the same may conform to the record of the case in the Patent Office.

Signed and sealed this 21st day of May, A. D. 1935.

Leslie Frazer (Seal)                                            Acting Commissioner of Patents.